C. H. MACK,
Assignor to W. J. PEYTON.
ARTIFICIAL TOOTH.
No. 9,985. Reissued Dec. 20, 1881.
*Fig. 1.* *Fig. 2.* *Fig. 3.* *Fig. 4.*
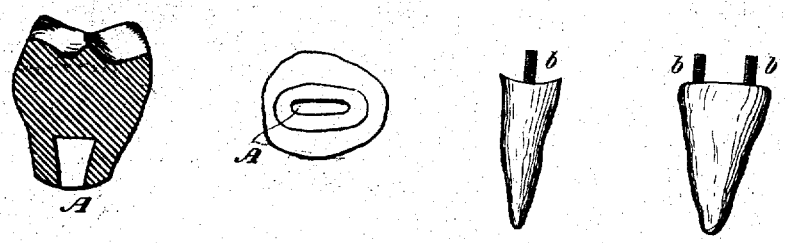
*Fig. 5.* *Fig. 6.*
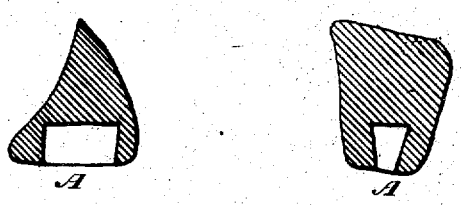
*WITNESSES*
Wm. A. Stinsly.
Geo. M. Jackson
*INVENTOR*
*Charles H. Mack,*
*By his Attorneys*
Baldwin, Hopkins & Peyton

UNITED STATES PATENT OFFICE.

CHARLES H. MACK, OF WALLA WALLA, WASHINGTON TERRITORY, ASSIGNOR TO WILLIAM J. PEYTON, OF WASHINGTON, DISTRICT OF COLUMBIA.

ARTIFICIAL TOOTH.

SPECIFICATION forming part of Reissued Letters Patent No. 9,985, dated December 20, 1881.

Original No. 123,271, dated January 30, 1872. Application for reissue filed May 2, 1881.

*To all whom it may concern:*

Be it known that I, CHARLES H. MACK, formerly of Portland, in the county of Multnomah and State of Oregon, but now residing at Walla Walla, Washington Territory, have invented certain new and useful Improvements in Artificial Teeth; and I do hereby declare that the following is a full, clear, and exact description thereof, reference being had to the accompanying drawings and the letters of reference marked thereon, which form a part of this specification.

The object of this invention is to permanently secure artificial tooth-crowns to natural tooth-roots while in the mouth in a manner that permits of easy manipulation and better results than have heretofore been possible; and my said invention consists, first, in an artificial tooth-crown having an undercut, shouldered, or dovetailed vertical opening, said opening, at the base of the crown, extending from near the lingual to near the labial or buccal surface thereof; secondly, in the combination of an artificial tooth-crown having an undercut or shouldered vertical opening with a natural tooth-root by means of, first, two retaining-pins projecting from the root, and, second, a material contained in said crown-opening in which said retaining-pins are embedded, said material being put into a soft state to permit the crown to be fitted to the root over the retaining-pins, and then allowed to harden to firmly embed said pins.

In the drawings, Figure 1 is a vertical section of an artificial molar-tooth crown, showing clearly the vertical undercut opening or dovetail mortise. Fig. 2 is a bottom view of said crown. Figs. 3 and 4 are views in elevation of a natural root prepared for the reception of the crown. Figs. 5 and 6 are vertical sections at right angles to each other through an artificial incisor-tooth crown.

The artificial crown A has a vertical undercut or dovetailed opening or mortise, *a*, to receive and retain a mass of retaining material, and also the upper ends of pins *b b*, secured in and projecting from the natural root B. The said opening not only extends vertically upward a sufficient distance from the base of the crown to enable the crown to be firmly anchored upon the pins, but it is also of such a shape as to extend from near the lingual surface of the crown to near the labial or buccal surface, thereby being of such dimensions as to be capable of receiving a mass of retaining material in which the pins which project from the root are embedded when the crown is fitted to the root. The crown is thus given the capacity of receiving a sufficient mass of retaining material to firmly secure it upon the root, and it also has sufficient latitude of movement to be accurately fitted or adjusted upon the root so as to have an artistic finish.

In applying my improved crown I first prepare the root, filling the nerve-cavity with gold or other appropriate filling. I then, at the anterior and posterior sides of the filling, drill a hole in the solid dentine for the admission of the pins *b b*, upon which are cut small screw-threads. The pins are then firmly secured in the holes. The opening in the crown is now filled with a fusible metal, one that will fuse at a low degree of temperature—such as the compound known as "Wood's fusible metal"—and while yet soft I press the crown firmly over the pins *b b*, so that the said pins will be embedded in the soft metal. As soon as the metal hardens it will be obvious that the crown will be firmly fastened to the root.

It will be particularly observed that the top of the root is slightly excavated, and that the crowns at the bottom are rounded or shaped so as to fit snugly therein.

The crown and root, when joined together as described, will form a strong and durable tooth. Additional durability and strength result from the curving of the crown to fit a corresponding seat in the root.

I am aware that artificial tooth-crowns for attachment to natural tooth-roots have been provided with a small round central hole to receive a retaining screw or pin projecting from the root; but they have not been found to meet the requirements of the art as to ease of application, durability, and strength. The small round hole will not retain the securing material as well as my enlarged undercut or shouldered opening, while securing the crown at the center only does not give the requisite strength and durability. The crown, I have found by experience, needs to be secured to the root not only at the center, but toward the anterior and posterior thereof, and this I accomplish by making the opening so large as to extend toward the labial and lingual surfaces as well as well up in the crown, so as to contain a mass of the retaining material in which the retaining-pins may be embedded.

I am also aware that artificial teeth and gums have been constructed with dovetail, shouldered, or retaining slots, and that the gums of artificial teeth having such slots were also provided with pins in said slots to aid in fastening the teeth and gums to the plate; but none of them involve my invention so far as I understand them. My object is to use the natural fang or root in connection with an artificial crown, and so secure the two together that the new tooth is as good and as strong as if grown wholly in the mouth, and this without the pain of extracting the root.

I am also aware that a recess has been formed on the outer surface of a crown; but this also differs radically from my invention, as it does not suggest a crown having the capabilities of mine, nor particularly a crown capable of receiving a mass of retaining material within it, extending at the base from near the lingual to near the labial or buccal surfaces, in order to secure the crown firmly to the root.

Having thus described my invention, I claim—

1. An artificial tooth-crown for application to natural tooth-roots while in the mouth, constructed, substantially as herein before set forth, with a vertical undercut, shouldered, or dovetailed opening, which extends at the base of the crown from near the lingual to near the labial or buccal surface thereof.

2. The combination, substantially as herein before set forth, of an artificial tooth-crown having a vertical undercut or shouldered opening with a natural tooth-root by means of two retaining-pins projecting from the root and a material which fills the crown-opening and embeds said pins therein, said material being put into a soft state to permit the crown to be fitted to the root over the retaining-pins, and then allowed to harden to securely fasten the crown and root together.

In testimony whereof I hereunto subscribe my name in the presence of two witnesses.

CHARLES H. MACK.

Witnesses:
T. J. ANDERS,
LEWIS B. NOBLE.